United States Patent [19]

Dessauer

[11] Patent Number: 4,963,192

[45] Date of Patent: Oct. 16, 1990

[54] PROCESS FOR THE PRODUCTION OF A PIGMENT-BASED AGENT SUITABLE FOR THE PAPER AND BOARD INDUSTRY AND IMPROVING THE PRINTABILITY OF PAPER AND BOARD

[75] Inventor: Guido Dessauer, Tutzing, Fed. Rep. of Germany

[73] Assignee: Hoechst Aktiengesellschaft, Frankfurt, Fed. Rep. of Germany

[21] Appl. No.: 148,989

[22] Filed: Jan. 27, 1988

[30] Foreign Application Priority Data

Feb. 10, 1987 [DE] Fed. Rep. of Germany ....... 3703957

[51] Int. Cl.[5] ........................ C09C 3/00; C09D 17/00

[52] U.S. Cl. .................................... 106/499; 106/486; 106/487; 428/403

[58] Field of Search ............... 106/416, 499, 486, 487; 428/403

[56] References Cited

U.S. PATENT DOCUMENTS

| | | | |
|---|---|---|---|
| 4,170,487 | 10/1979 | Robertson et al. | 106/499 |
| 4,291,112 | 9/1981 | Lu | 106/499 |
| 4,412,018 | 10/1983 | Finlayson et al. | 106/287.3 |
| 4,517,112 | 5/1985 | Mardis et al. | 106/287.17 |
| 4,695,511 | 9/1987 | Goodman et al. | 106/416 |

FOREIGN PATENT DOCUMENTS

| | | | |
|---|---|---|---|
| 57-126857 | 8/1982 | Japan | 106/501 |

*Primary Examiner*—Paul Lieberman
*Assistant Examiner*—Christine A. Skane

[57] ABSTRACT

The invention relates to a process for the production of an agent suitable for the paper and board industry and improving the printability of paper and board, wherein an aqueous colloidal system is prepared from at least one pigment and at least one water-soluble or water-swellable hydrogel containing anionic groups, said system is subjected to coacervation by means of a quarternary organic ammonium salt and, if appropriate, the product obtained in the coacervation is concentrated by sedimentation, centrifuging and/or filter-pressing, to the agent produced and to the use thereof in the paper and board industry.

8 Claims, No Drawings

PROCESS FOR THE PRODUCTION OF A PIGMENT-BASED AGENT SUITABLE FOR THE PAPER AND BOARD INDUSTRY AND IMPROVING THE PRINTABILITY OF PAPER AND BOARD

DESCRIPTION

Process for the production of a pigment-based agent suitable for the paper and board industry and improving the printability of paper and board, the agent and its use.

The invention relates to a process for the production of a pigment-based agent suitable for the paper and board industry and improving the printability of paper and board, to the agent produced by this process and to the use thereof.

German Offenlegungsschrift No. 3,506,278 (U.S. Ser. No. 831,638) has disclosed a process for improving the holdout of printing inks, finishes and coating compositions, containing organic solvents, on sheet-like structures of fibers, especially on paper, by introducing water-insoluble substances into the fiber pulp or into the surface of the fiber structure, which process comprises introducing an organophilic complex composed of (a) a water-insoluble hydrated cation-exchangeable film-forming smectic phyllosilicate having an ion exchange capacity of at least 50 meq/100 g and (b) an organic radical bound thereto and derived from an onium compound into the fiber pulp or into the surface of the fiber structure, the organophilic complex forming a barrier layer by reaction with the organic solvent.

The reasons why the holdout behavior of a surface can be influenced by means of such an organophilic complex have not yet been fully elucidated.

In the journal "Wochenblatt für Papierfabrikation" 114, 1986, No. 6, pages 177–181, G. Dessauer discusses the penetration behavior of gravure printing inks and reports first preliminary results on the use of such organophilic complexes. In the same journal 114, 1986, No. 6, pages 182–187, A. Breunig reports laboratory investigations for improving the holdout of printing inks, confirming the efficacy of the organophilic complexes described in German Offenlegungsschrift No. 3,506,278.

It has been found that the best holdout results are obtained when the reactive organophilic complex is applied to the paper surface directly from organic solvents. The result was that an application of 0.3 to 1.0 g per square meter (calculated dry) is fully sufficient to obtain an optimum holdout effect for printing inks and coatings. It can be shown by means of scanning electron micrographs that a fine and uniform layer of the reactive organophilic complex is present on the entire surface. The auto-adhesion suffices to form a closed and adequately adherent film.

A disadvantage of this application method is, however, that the coating must be applied from an organic solution, which is rather undesirable if only for reasons of protecting the environment.

Attempts to use the reactive organophilic complex from the water phase failed, inter alia, because such considerable quantities are required on introduction into the pulp suspension that economical exploitation of the process described in German Offenlegungsschrift No. 3,506,278 is no longer possible or coating from the water phase gives a useful result only if the complex is pre-swollen by means of a minimum quantity of 30% of a water-dilutable solvent to an extent which allows adequately fine dispersing. The coating thus obtained gave a result equivalent to pure solvent coating only if the paper was resatinized at about 90° C. The application quantities then required were again of a similar order of magnitude as impure solvent coating, but with a trend to somewhat larger quantities.

The application of a water/solvent mixture may in some cases be acceptable, but this is certainly not the least expensive way.

After it had been found that the efforts to employ the reactive organophilic complex in the paper or board pulp do not bring the desired holdout effect until quantities of about 5–8%, relative to total solids, or higher are used, it also became clear that, although this is possible, it would not easily gain acceptance, for cost reasons.

The earlier German Patent Application No. P 3,634,277.7 of Oct. 8, 1986, bearing the title "Agent for improving paper and board", is concerned with the object of applying a reactive complex, improving the holdout of printing ink, to paper from the water phase and without any solvent.

It is the object of the present invention to achieve a simplification and improvement of the process known from German Offenlegungsschrift No. 3,506,278 and, in particular, to provide an environmentally acceptable process, which is easy to carry out and avoids the use of organic solvents, for producing a pigment-based agent suitable for the paper and board industry and improving the printability of paper and board.

It has now been found that the stated object can be achieved by means of an agent which is produced by preparing an aqueous colloidal system from at least one pigment and at least one water-soluble or water-swellable hydrogel containing anionic groups, subjecting said system to coacervation by means of a quaternary organic ammonium salt and, if appropriate, concentrating - by known methods - the product obtained in the coacervation by sedimentation, centrifuging and/or filter pressing.

The invention is thus based on the finding that the printing properties of paper, especially those of thin printing paper used in gravure printing, can be considerably improved by treating the paper, and also board, in the pulp or on the surface with an agent which is composed essentially of particles obtained by coacervation from at least one pigment, a water-soluble or water-swellable hydrogel containing anionic groups and a quaternary ammonium salt, and in which the solid pigment particles are "microencapsulated" by a kind of cover composed of the two other components.

According to the process of the invention, a pigment or pigment mixture is thus enclosed by controlled coacervation with a water-insoluble cover, for example a water-insoluble organophilic silicate, and in particular in such a finely dispersed form that a cover is applied to virtually every individual pigment grain.

The result of the invention is that organophilic phyllosilicates free of organophilic solvents, for example, free of isopropanol, are introduced into the paper pulp as well as that coating preparation/application compositions are produced.

Although it is known to envelop solid particles with gelatine by coacervation, it is not known to make pigments modified by coacervation available to the paper industry.

It has proved to be advantageous when the coacervation or microencapsulation, carried out according to the invention, of the pigment particles takes place at low stock consistencies or preferably 2 to 15% total solids content, especially 3 to 5% solids content, i.e. at a comparatively high dilution.

Additionally, however, it is also possible to operate at higher concentrations, for example in a caddy mixer at solids contents of about 65 to 70%.

An agent produced by the process according to the invention can be applied by conventional methods to a paper, board, cardboard or a matted surface and then smoothed on a glazing calender. The agent can, however, also be mixed into a paper pulp, for example, and processed in the known manner on a paper machine, board machine or wet mat machine, the reactive properties of the particle covers or capsule walls being exploited for improving the holdout and the printability at filler contents of the finished product of, for example 10 to 35% by weight.

When coating paper and board, it is customary, as is known, and also desirable for reasons of appearance to add pigments, in particular kaolins, calcium carbonate, titanium dioxide and talc. The most diverse variants are possible from unpigmented application up to a coating with about 94% of pigment and 6% of binder content.

When a mixture is prepared from an inert white pigment, for example kaolin, and a reactive complex improving the printability, the result logically is that, although the opacity, the volume or the whiteness of the coat are improved with the increase in the percentage content of inert pigment, the desired holdout effect decreases, i.e. is watered down.

In German Offenlegungsschrift No. 3,506,278, Example 3, a coating composition is described which comprises 96 parts of kaolin and 4 parts of reactive organophilic bentonite which has been very finely dispersed mechanically. This coating composition is bound, as usual, by a plastic dispersion. After hot glazing, an improvement is found, but only at an applied coating of 7 $g/m^2$ per side. Making the simplified assumption that the dispersed reactive organophilic bentonite particles are of the same order of size as the kaolin particles, there is one particle of reactive organophilic complex per 26 kaolin particles in this Example.

If the organophilic bentonite is reacted in the presence of the already introduced kaolin at the concentrations, customary in industry, of 200 g/l in the ratio of, for example, 10 parts by weight of bentonite per 1 part per weight of kaolin to give the reactive complex, a hydrophobic product is obtained, with full ion exchange, which is just as difficult to disperse as a pure organophilic silicate.

For really perfect dispersing, the addition of a water-miscible solvent such as, for example, isopropanol is here again necessary in order to obtain a finely dispersed, stable, homogeneous dispersion.

Surprisingly, it has now been found that the problem of fine dispersity solves itself if the process according to the invention is used. In this case, an advantageous procedure is first to pre-disperse a pigment, for example kaolin, talc, calcium carbonate or another conventional pigment or a mixture of pigments, in water at a comparatively high dilution.

The coacervation is effected by reacting the three components, namely hydrogel, quaternary ammonium salt and pigment, in water, and the addition of the three components can be carried out in any desired order. Preferably, the pigment is first reacted with the quaternary ammonium salt and the hydrogel is then added.

The reaction of the hydrogel containing anionic groups, for example Na bentonite, with the quaternary ammonium salt in the presence of the pigment takes place preferably in a comparatively high dilution in water. In this way, a finely dispersed, comparatively very thin suspension is obtained, which contains the pigment and the organophilic silicate, the latter enveloping the pigment particles. The fact that the organophilic silicate is being formed can be seen from the phase separation between the colloid and the pure water settling out at the top. The resulting product sediments, albeit not very rapidly. However, it is also possible first to produce a suspension of quaternary salt and pigment particles and to add the hydrogel thereto. In a typical manner, the procedure can be as follows, for example:

A 1% by weight solution, relative to the active compound, of the quaternary ammonium salt, for example dimethyldioctadecylammmonium chloride, is first prepared by heating in water to about 70° C.. This solution is then added, for example, to a 5% kaolin suspension, in particular in a quantity which is required to form 10% of organophilic silicate. The quaternary salt is absorbed on the kaolin, since the latter itself has an ion exchange capacity of about 3 to 5 meq., and these must be taken into account in calculating the quantities. A 2% by weight colloidal dispersion of Na bentonite in water is prepared and then added slowly to the suspension of the kaolin with the quaternary salt, with constant stirring.

In this way, about 132 mol equivalents, relative to bentonite, are exchanged. A phase separation of the resulting mixture is observed. Heating, for example to 70–80° C., accelerates the phase separation. After the mixture has been left to stand for several hours in a separating funnel, half the total quantity can be drawn off as a clear aqueous, slightly salty solution. The product thus obtained contains about 6 to 8% of dry matter. It can be further thickened by any desired methods. The converse approach, namely the addition of the Na bentonite dispersion to the pigment and subsequent reaction with the quaternary ammonium compound in, for example, a 1% solution, leads to the same result.

The phenomenon of agglomerates, which are difficult to disperse, no longer arising in the case of an adequate free path length in the conversion reaction of inorganic phyllosilicate and quaternary ammonium compound, because the procedure is carried out in extreme dilution, can only be explained in that a kind of covering of the dispersed pigment particles initially introduced has taken place.

Since, inter alia, a maximum of opacity is generally desired in the coating of paper and board, it is frequently advantageous to use the coacervate obtained from an inorganic known phyllosilicate.

In an advantageous manner, the procedure in the process according to the invention starts from a hydrogel obtained from the colloidal dispersion of a hydrated, cation-exchangeable, film-forming smectitic phyllosilicate having an ion exchange capacity of 50 to 120 meq./100 g. Examples of such phyllosilicates are montmorillonite, hectorite, saporite, sauconite, beidellite, nontronite and preferably bentonite. However, the most diverse water-soluble or water-swellable coacervable hydrogels, containing anionic groups, of natural or synthetic organic polymers can also be used according to the invention. Examples of such polymers are oxidized starch and the most diverse carboxymethylcelluloses.

In an advantageous manner, conventional known water-insoluble fluorescent brighteners can also be added, i.e. used together with the quaternary ammonium salt. These water-insoluble fluorescent brighteners then turn up in the resulting organophilic complex on the outside of the pigment.

The quaternary organic ammonium salts used can be those of the following formulae (1) to (8)

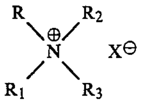

(1)

in which R is $C_8$–$C_{22}$-alkyl, $C_8$–$C_{22}$-alkenyl or a group of the formula $-(A-O)_y-C_8-C_{22}$-alkyl, $R_1$ is $C_1$–$C_4$-alkyl or benzyl, $R_2$ is hydrogen, $C_1$–$C_{22}$-alkyl, $C_1$–$C_{22}$-alkenyl or a group of the formula $-(A-O)_y-B$ or of the formula $-(A-O)_y-C_8-C_{22}$-alkyl, $R_3$ is hydrogen, $C_1$–$C_4$-alkyl or a group of the formula $-(A-O)_y-B$, A is $C_1$–$C_4$-alkylene, B is hydrogen or a group of the formula -COR, y is a number from 1 to 25 and X is an anion;

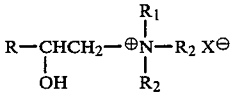

(2)

in which X, R, $R_1$ and $R_2$ are as defined above:

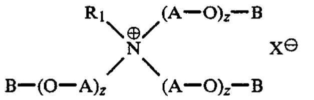

(3)

in which each z is a number from 1 to 10 and X, $R_1$, A and B are as defined above;

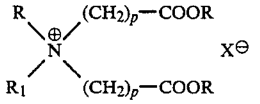

(4)

in which p is 1 or 2 and X, R and $R_1$ are as defined above;

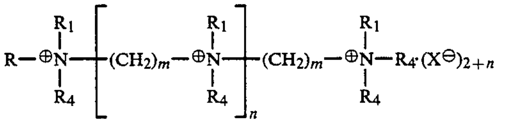

(5)

in which the groups $R_4$ can be identical or different and are hydrogen, $C_1$–$C_4$-alkyl, benzyl or a group of the formula $-(A-O)_z-B$, m is 2 or 3 and n is 0 or 1, and X, R, $R_1$, A, B and z are as defined above;

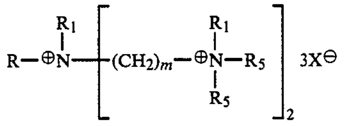

(6)

in which $R_5$ is hydrogen, $C_1$–$C_4$-alkyl or benzyl and X, R, $R_1$ and m are as defined above;

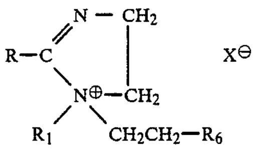

(7)

in which $R_6$ is OH, $NH_2$ or a group of the formulae -OCOR or -NHCOR and X, R and $R_1$ are as defined above; and

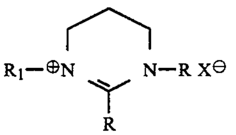

(8)

in which X, R and $R_1$ are as defined above.

Of all the quaternary organic ammonium salts, the compounds of the formula 1 are preferred. In the compounds of the formulae 1 to 8, the following groups are preferred: $R=C_{12}$–$C_{18}$-alkyl or $C_{12}$–$C_{18}$-alkenyl, $R_1$=methyl or ethyl, $R_2$=methyl, ethyl, $C_{12}$–$C_{18}$-alkyl or $C_{12}$–$C_{18}$-alkenyl, $A=C_1H_4$ or $C_3H_6$ and n=1 or 2. Substituents representing $C_8$–$C_{22}$-alkyl or $C_8$–$C_{22}$-alkenyl groups can here especially be those groups which are derived from natural fatty acids and their mixtures such as, for instance tallow fatty acid, coconut fatty acid, oleic acid, palmitic acid and stearic acid. Examples of possible anions are chloride, bromide, sulfate, methosulfate, dimethophosphate, phosphate or anions of organic acids such as acetic acid, propionic acid, trichloroacetic acid, lactic acid, citric acid, tartaric acid, tartronic acid, oxalic acid and malonic acid.

Advantageously, the procedure is such that the proportion by weight of the pigment core cover formed by the coacervation or the capsule wall, i.e. the proportion of hydrogel relative to the total quantity of solids of all the components, is adjusted to 5 to 40% by weight, preferably 10 to 20% by weight. The proportion by weight of quaternary ammonium salt on the pigment core cover or capsule wall can vary. It depends on the ion exchange capacity of the hydrogel, for example the phyllosilicate, and on the extent of the ionic exchange which has taken place. This means that, depending on the quantity of ammonium salt added, a virtually complete ion exchange or, alternatively, an incomplete ion exchange is effected. It is also possible to use such a quantity of ammonium salt that the "microencapsulated" particles obtained are cationic and repel each other. Relative to the hydrogel, the agents according to the invention comprise 1 to 50% by weight of quaternary ammonium salt and 50 to 99% by weight of the hydrogel or phyllosilicate.

Using the pigments covered by the process according to the invention under comparatively high dilution, surface preparations can, after thickening via sedimentation, centrifuge or the like, be applied to paper or board by known processes. If, for example, the ratio of pigment to reactive organophilic complex formed is 10 to 1, 0.27 $g/m^2$ of organic complex are applied, for example at 3 $g/m^2$ per side. When this coating is glazed hot, the reactive complexes, located on the kaolin for example, effect an excellent holdout for gravure printing ink. The function of the reactivity with the printing ink can in this way be combined with the need for visual covering of the paper surface, without the layer thickness having an effect on the printing behavior. Assuming that a normal coating kaolin has a specific surface area of 6 to 8 $m^2/g$, the reactive organophilic complex will, in pigment covering, have a specific surface area of the same order of magnitude. This means a very substantial increase in the specific surface area of the reactive complexes as compared with simple mixing.

The pigments covered by the process according to the invention are hydrophobic. This means that they are no longer bound by the conventional starches. Plastic dispersions adjusted to hydrophilic pigments can also no longer be used. However, the covered hydrophobic pigments can be perfectly bound with plastic dispersions such as, for example, those based on methyl methacrylate (Rohagit SD 25) or on styrene-acrylate (Dow latex 695). For example, 6% of binder, relative to the covered pigment, suffice for obtaining a coating bond suitable for gravure printing. Due to the thermoplastic deformability of the organophilic silicates, adhesion to the outer layer of the pigments results on hot glazing. For manipulation during production, however, binding by means of a binder which is compatible with the covered pigment is appropriate. For surface treatment of the paper by the agent to be produced according to the invention, this agent is incorporated into a suitable binder such as, for instance, polyvinyl alcohol or a styrene/acrylate dispersion and applied to the paper in the usual manner. The proportion of binder is then about 5 to 20% by weight, and the quantities of these mixtures applied to the paper are in general 0.1 to 10 $g/m^2$. The pigments covered by the process according to the invention can also be used in the headbox of a paper which is to be treated in the pulp. Due to the substantially increased specific surface area, smaller quantities of the reactive substance are evidently sufficient. The quantity of the agent prepared according to the invention here is about 12 to 35% by weight, relative to the fiber content.

If Na bentonite is used as the hydrogel containing anionic groups for carrying out the process according to the invention, it is not necessary to start from a fully purified Na bentonite. Rather, it is also possible, for example, to use commercially available simple bentonite containing about 75% of active compound, such as is used, for example, in effluent treatment, as the coacervable colloid. Remarkably, the pronounced characteristic coloration of this material does not play the expected adverse role in the case of covering a pigment of higher whiteness per se.

By covering $CaCO_3$ in accordance with the proposal of this invention, the stability of this pigment in a paper mill circulation containing aluminum sulfate is evidently improved, and this is an extremely desirable side effect.

The pigment-based agents which can be produced by the process according to the invention can also be used in an advantageous manner for the production of paints based on plastic dispersions, for the production of water-based paints, for the production of wallpaper priming compositions and wallpaper inks, that is to say, for example, they can be used with advantage wherever an improvement in weathering resistance, wiping resistance or washing resistance or the like is important.

The examples which follow are intended to illustrate the invention in more detail:

Example 1

50 g of a commercially available fine paper kaolin (Dorfner FP 75) are finely dispersed for 15 minutes in 1 liter of water by means of a high-shear mixer (Ultraturrax, manufacturers: Jahnke and Kunkel). No dispersing aid is added, since virtually all commercially available paper kaolins already contain such aids, in most cases anionic ones.

2.3 g of commercially available dimethyldioctadecylammonium chloride of 77% active compound content (Präpagen WK, manufacturer: Hoechst AG) are dissolved in 230 ml of water at 70° C. The resulting solution of the highly cationic quaternary ammonium salt is added to the kaolin suspension with continued further stirring. 4.3 g of commercially available Na bentonite (Opazil), from which quartz and barite have not been removed, are dispersed in 215 ml of water and likewise intensively sheared for 15 to 20 minutes in a high-shear mixer of the indicated type, until a homogeneous hydrosol has been obtained.

The resulting fully hydrated, film-forming water/Na bentonite mixture has an active compound content of reactive and ion-exchangeable bentonite of 3.23 g. About 5 g of a water-insoluble organophilic phyllosilicate precipitate on the kaolin initially introduced. The total quantity of the resulting aqueous dispersion of just under 1500 ml separates into a water phase and a sedimenting dispersion phase. This separation is accelerated at 70° C. In a separating funnel, the reaction mixture obtained can be concentrated overnight to about 700 ml, which then contains 55 g of solid matter. This corresponds to a solids content of about 7.86% by weight. Relative to the-solids content, 6% by weight of a styrene/acrylate latex (3.3 g as a solid or 6.6 g of a commercially available plastic dispersion of 50% solids content) are then added thereto. After this binder has been carefully and gently stirred in, a coating of 3.5 $g/m^2$ per side is then applied in the usual manner to a conventional wood-containing coating base-paper of 38 $g/m^2$. After drying, glazing to optimum gloss is carried out in a conventional glazing calender at a steel roll temperature of 90° C. This coat then contains about 8.63% by weight of a reactive organophilic silicate corresponding to about 0.3 $g/m^2$ per side. A gravure print applied thereto from toluene solution shows excellent holdout for the ink and outstanding print gloss.

Example 2

Starting from the reaction mixture of kaolin and an organophilic phyllosilicate, prepared according to Example 1, a mixture comprising 40% by weight of this mixture and 60% by weight of a fiber stuff mixture is stirred together. The fiber stuff mixture comprises 25% of long-fibered sulfate pulp, ground to 23° Schopper-Riegler freeness, and 75% of soft wood mechanical pulp of 74° S.R.

A 45 $g/m^2$ sheet of 32% by weight filler content is prepared from this mixture on a Rapid-Koethen sheet former. After glazing on a calender at roll temperatures of 110° C., the paper is printed in a test printer. Substantially improved uptake of the gravure printing ink, improved gloss, higher color depth and reduced tendency to missing dots are found here.

Example 3

35 g of a commercially available calcium carbonate (Durcal) are dispersed in 1 liter of water by means of an intensive stirrer, without addition of an auxiliary. A 2% dispersion of fully purified Na bentonite in water is prepared with intensive stirring. 162 ml of this colloidal dispersion of the inorganic phyllosilicate are added to the calcium carbonate dispersion with intensive stirring. Using hot water, a 2% by weight solution of commercially available dimethyldistearylammonium chloride is prepared. This solution, while warm, is added with stirring to the mixture of carbonate and Na bentonite, until about 120 to 125 ml have been introduced. This corresponds to an equimolar quantity, relative to bentonite, of about 130 to 135 meq. This means that a small excess of the strongly cationic quaternary ammonium salt over the quantity convertible via ion exchange was used. This improves the mutual repulsion of the covered particles formed.

After settling and decanting of the supernatant water, a suspension of covered carbonate particles in water, having a solids content of 8%, is obtained. With 4.5% by weight of a plastic binder based on methyl methacrylate (Rohagit SD 25, manufacturer: Röhm GmbH), introduced as a conventional plastic dispersion, a spreadable coating composition is obtained which is applied in the conventional manner to paper or board. At an applied coating of 4 $g/m^2$, the coat contains 0.5 $g/m^2$ of reactive organophilic phyllosilicate, which is a quantity sufficient for almost complete holdout of solvents and hence also solvent-containing printing ink. In this example again, glazing at high temperature is necessary in order to ensure sufficient packing density of the covered pigments in this coat.

Waste paper obtained from this paper or board thus coated has an increased resistance of the calcium carbonate in alum-containing paper stuff mixtures. The deinkability of this coat is also improved according to the invention, since less printing ink is required to achieve the same color depth.

Example 4

40-g of a high-grade coating kaolin (SPS type, manufacturer: English China Clay Corp.) are finely dispersed in 1000 ml of water. 0.7%, relative to the active compound content, of a fluorescent brightener for oils and fats, partially dissolved in isopropanol, is mixed in a ratio of 1 to 2 to a master paste of dimethyldistearylammonium chloride and intensively stirred in. For this purpose, it is advisable to heat the paste to about 60 to 70° C. in a water bath. The quaternary ammonium salt is then diluted in hot water down to a concentration of 1% by weight. 245 ml of this solution are admixed with stirring to the kaolin suspension. 215 ml of a commercially available 2% Na bentonite slurry (Opazil, manufacturer: Südchemie AG) are then added.

This gives pigments which are covered with the organophilic silicate and already have themselves a high whiteness, the pigment cover containing the water-insoluble fluorescent brightener. Using a compatible plastic binder as described in Example 3, an fluorescent brightened coat of high whiteness is obtained, which shows particularly good holdout for gravure printing inks and rotary offset printing inks. Here again, good hot glazing must be carried out after coating and drying of the paper web. Here too, the packing density of the covered kaolin particles is of great importance.

Example 5

A 4% solution of carboxymethyl cellulose is admixed to an aqueous mixture of coating kaolin and talc in a weight ratio of 8 to 2, having a solids content of 50 g/l in water, until 20% by weight of CMC, calculated on a dry basis relative to the pigment mixture, have been introduced. This is reached at 250 ml. After homogeneization has been carried out, a 2% by weight solution of the quaternary organic ammonium salt (dimethyldioctadecylammonium chloride) is added until a phase separation of the mixture takes place and the water has separated from the coacervate. A small additional quantity of ammonium salt is then added. In this case, the ammonium salt remains adsorptively bound and facilitates the dispersed behavior of the reaction product obtained. The latter is thickened by means of a trailing-blade centrifuge and coated onto paper by means of a conventional plastic binder.

I claim:

1. A process for the production of an agent for improving the printability of paper and board, said agent being suitable for the paper and board industry, said process comprising:

sequentially preparing an aqueous colloidal system from at least one pigment and at least one water-soluble or water-swellable, hydrated cation-exchangeable, film-forming smectic phyllosilicate having an ion exchange capacity of 50 to 120 meg/100 g and subjecting said system to coacervation by means of a quaternary organic ammonium salt, thereby providing a coacervated product.

2. The process as claimed in claim 1, wherein the quaternary organic ammonium salt used is stearyldimethylbenzyl ammonium chloride or distearyldimethylammonium chloride.

3. The process as claimed in claim 1, wherein the smectitic phyllosilicate used is Na bentonite.

4. The process as claimed in claim 1, wherein the coacervated product is concentrated.

5. A process for the production of an agent for improving the printability of paper and board, said agent being suitable for the paper and board industry, said process comprising: sequentially preparing an aqueous colloidal system from at least one pigment and a quaternary ammonium salt and subjecting said system to coacervation with at least one water-soluble or water-swellable, hydrated cation-exchangeable, film-forming smectic phyllosilicate having an ion exchange capacity of 50 to 120 meg/100 g, thereby providing a coacervated product.

6. The process as claimed in claim 5, wherein the quaternary organic ammonium salt used is stearyldimethylbenzyl ammonium chloride or distearyldimethyl ammonium chloride.

7. The process as claimed in claim 5, wherein the smectic phyllosilicate used is Na bentonite.

8. The process as claimed in claim 5, wherein the coacervated product is concentrated.

* * * * *